INVENTOR.
MANFRED K. BURCKHARDT
BY Dicke and Craig
ATTORNEYS

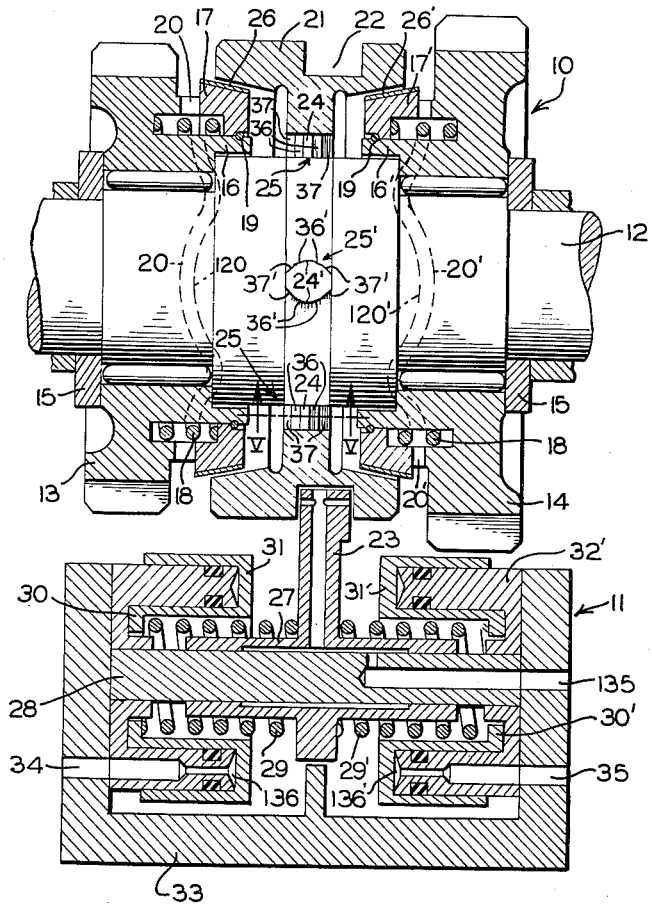

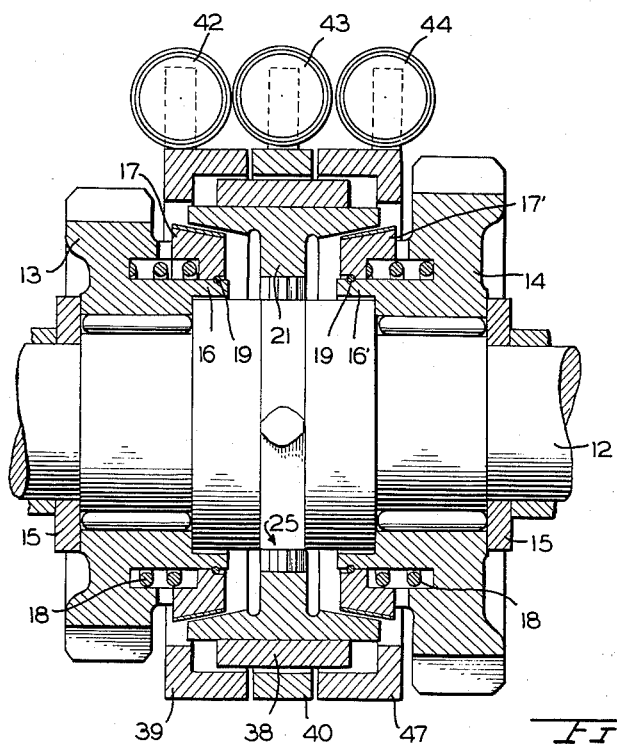
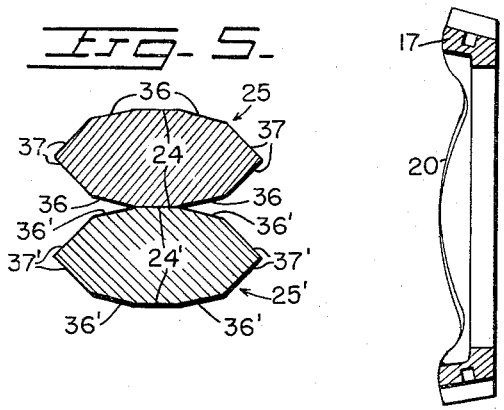

United States Patent Office 3,001,413
Patented Sept. 26, 1961

3,001,413
TRANSMISSION INCLUDING DISENGAGING CLUTCH CONSTRUCTION
Manfred H. Burckhardt, Stuttgart, Germany, assignor to Daimler-Benz Aktiengesellschaft, Stuttgart-Unterturkheim, Germany
Filed June 16, 1958, Ser. No. 742,196
Claims priority, application Germany June 26, 1957
31 Claims. (Cl. 74—359)

The present invention relates to a disengageable clutch, especially for motor vehicle change-speed transmissions, with conically shaped synchronizing and force-locking surfaces at both clutch parts to be connected with each other and with inclined surfaces for producing from the torque an axial thrust for the axially movable clutch part effective in the direction of engagement, as disclosed, for example, in the copending application Serial No. 708,412, filed on January 13, 1958, now Patent No. 2,942,712 issued June 28, 1960, in the name of Werner E. Altmann, entitled "Selectively Engageable Change-Speed Transmisson," and assigned to the assignee of the present application.

Clutches of the type mentioned hereinabove have been proposed already in the prior art primarily for motor vehicle change-speed transmissions. It is also known that for purposes of shifting change-speed transmissions, free-wheeling devices normally offer numerous advantages. For that reason, free-wheeling devices have been installed recently with preference into those transmissions which are adapted to shift without interrupting the transmission of drive or torque. The use of free-wheeling devices, however, has the general disadvantage that the engine can no longer be used for purposes of braking because with a pushing vehicle, i.e., with the vehicle driving the engine, the free-wheeling device interrupts the transmission of force or torque. For that reason, these types of constructions can be used only for vehicles with a relatively small total weight or only with those vehicles which are primarily intended to be driven in flat terrain.

The present invention aims at a construction for a shifting device producing a free-wheeling-like effect and solves the problems involved in connection therewith by constructing the clutch of the type mentioned hereinabove, utilizing corresponding inclinations of the conically shaped synchronizing and force-locking surfaces and by selective or adjustable pre-tensioning or pre-loading of the axially movable shifting sleeve, as a lockable free-wheeling-like clutch which is automatically engageable or disengageable in the prevailing shifting direction upon the occurrence of synchronism in the rotational speed of the two parts thereof to be coupled with each other or with reversal of torque.

For that purpose, it may be advantageous to construct the conically shaped synchronizing and force-locking surfaces with an angle of inclination which lies in proximity to the point of self locking, however, not therebelow.

A further possibility of the construction in accordance with the present invention resides in that, for purposes of producing the requisite abutment or engaging force during the synchronizing operation as well as upon force-locking, the movable clutch part is connected with the shaft carrying the same over inclined surfaces which are provided with different inclinations for the synchronizing and force-locking positions and which during axial movement of the movable clutch part come sequentially into operative abutment. In connection therewith, the synchronizing and force-locking surfaces may be provided in any suitable manner as will appear more fully hereinafter.

A radially or axially springy synchronizing ring having limited rotatability may be arranged at one of the clutch parts which synchronizing ring is provided with a corresponding locking surface and releases the further axial movement of the movable clutch part from the synchronism position into the force-locking position thereof only upon attaining synchronism in the rotational speed. Appropriately, the shifting sleeve may be selectively prestressed or pretensioned into the engaging or disengaging direction at the movable clutch part over a shifting fork or any other suitable engaging member by means of an actuating member controlled by an auxiliary or servo force, possibly by the interconnection or interposition of spring-force storage means.

This pretensioning or preloading force may be obtained in connection with some embodiments of the present invention by providing as actuating member for the shifting fork or the other shifting member a hydraulically or pneumatically actuated pressure cylinder arrangement which possibly may be disposed parallel to the clutch axis. However, it is also possible in accordance with another embodiment of the present invention to pretension and move the shifting fork or other shifting member in the engaging or disengaging direction by an electric auxiliary force, for example, by an electromagnet.

By the use of a clutch in accordance with the present invention, the effect of a free-wheeling-like device which is effective in both directions and which is adapted to be locked may be obtained in an advantageous manner. By an appropriate pretensioning of the shifting member in the desired shifting direction, the engaging or disengaging operation may be prepared, and after synchronism of the parts to be clutched is attained or after the torque, during reversal thereof, passes through the zero point the engaging or disengaging operation may then be initiated automatically by the clutch itself. As a result of such an arrangement, a shifting is possible without interrupting the transmission of force or torque whereby, however, the disadvantages of the known free-wheeling devices as to uni-directional operability thereof are avoided and, above all, simultaneously an unobjectionable synchronization is attained.

Accordingly, it is an object of the present invention to provide a disengageable clutch, particularly for motor vehicle change-speed transmissions which offers the advantages of a free-wheeling device yet enables a transmission of torque in either direction at all times.

Another object of the present invention is the provision of a disengageable clutch of the type mentioned hereinabove, which is simple in construction and reliable in operation and which facilitates shifting of the transmission.

Still another object of the present invention is the provision of a disengageable clutch construction offering a free-wheeling effect without the interruption of the transmission of torque during reversal of the torque which at the same time facilitates shifting of the transmission in a shock-free manner and without interruption of torque by assuring synchronism and automatically initiates the engaging or disengaging operation of the clutch once synchronism is attained or the torque reaches the zero point during reversal in the direction of flow thereof.

These and other objects, features and advantages in accordance with the present invention will become more obvious from the following description when taken in connection with the accompanying drawing which shows, for purposes of illustration only, several embodiments in accordance with the present invention, and wherein:

FIGURE 1 is an axial cross-sectional view through a first embodiment of a shifting clutch in accordance with the present invention having a hydraulic actuating mechanism;

FIGURE 2 is an axial cross-sectional view through another embodiment of a shifting clutch in accordance with the present invention provided with an electromagnetic actuating mechanism;

FIGURE 4 is an axial cross-sectional view through a synchronizing ring by itself;

FIGURE 5 is an enlarged partial cross-sectional view taken along line V—V of FIGURE 1; and FIGURE 6 is a partial elevational view of the pin members 25 and 25', illustrated in FIGURE 1.

Figure 3:
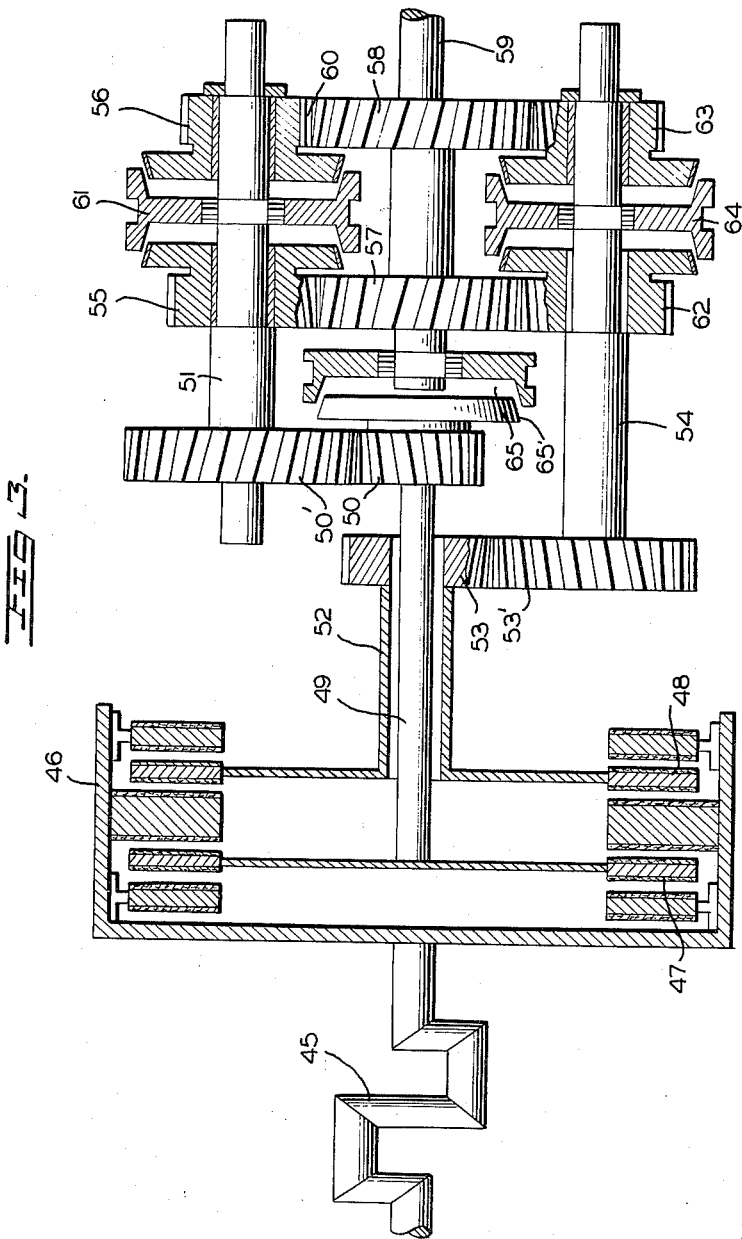
FIGURE 3 is a schematic cross-sectional view of a change-speed transmission utilizing shifting clutches of the type described herein.

Referring now to the drawing, wherein like reference numerals are used throughout the various views to designate like parts, and more particularly to FIGURE 1, reference numeral 10 generally designates a shifting clutch which is operatively connected with an actuating mechanism generally designated by reference numeral 11. Two gear wheels 13 and 14 are rotatably supported in any suitable manner on a shaft 12 which may be, for example, the output shaft of a change-speed transmission, and which are secured in the axial direction thereof by disks 15 or the like. One synchronizing ring 17 and 17' each closed upon itself is supported on a respective lateral projection or hub portion 16 and 16' provided on gear wheels 13 and 14. Each synchronizing ring 17 and 17' is always pretensioned or preloaded by a spring 18 in the direction toward the other clutch half. A spring or snap ring 19 or any other suitable securing means limits the axial movement of each synchronizing ring 17 and 17'. Instead of the synchronizing rings 17 and 17' which are closed upon themselves, radially springy slotted synchronizing rings of conventional construction may also be used which are similar to the ring illustrated in FIGURE 4 except that such ring would be split, as is well known in the art.

Sinusoidally shaped locking surfaces 20 and 20' are provided at the end faces of the synchronizing rings 17 and 17' which locking surfaces 20 and 20' cooperate with correspondingly constructed counter surfaces 120 and 120' provided at the adjoining faces of gear wheels 13 and 14. These locking surfaces produce the desired effect that upon relative rotation of the synchronizing ring 17 or 17' with respect to the corresponding gear wheel 13 or 14 an axial movement of the synchronizing ring 17 or 17' in the direction in opposition to the effect of the respective spring 18 is prevented by these locking surfaces 20 and 20' displaced thereby relative to the corresponding countersurfaces 120 and 120'. The arrangement is so made that the rise or lift of the locking surfaces is slightly larger than the free intermediate space between a respective gear wheel and the corresponding snap ring 19 so as to limit the amount of such relative movement.

The movable clutch half is formed by a shifting sleeve 21 which is provided with an annular groove 22 for purposes of engagement therein of the shifting fork 23 or of any other suitable appropriate shifting member. The connection of shifting sleeve 21 with the shaft 12 takes place over radial mutually engaging pins 25 and 25' provided internally on shifting sleeve 21 and externally on shaft 12, respectively. The pins 25 and 25' are thereby provided, in addition to the axially extending abutment surfaces 24 and 24' thereof, with inclined surfaces for purposes of producing an axial thrust effective in the direction of engagement or disengagement. More particularly, each of the pins 25 and 25' is provided with inclined surfaces 36 and 36' having a relatively smaller inclination and with inclined surfaces 37 and 37' having a relatively larger inclination, wherein surfaces 36 and 36' are used in connection with the synchronizing operation and surfaces 37 and 37' in connection with the force-locking positions of the various parts.

The shifting sleeve 21 and the synchronizing rings 17 are provided with conically shaped engaging surfaces 26 and 26' which form simultaneously the synchronizing as well as the force-locking surfaces. However, it is also within the scope of the present invention to provide additionally, for example, separate force-locking surfaces at the gear wheels 13 and 14 adjacent the synchronizing rings 17 and 17'. The engaging surfaces 26 and 26' are each provided with a knurled surface or with a surface roughened up in any other suitable manner in order to attain a reliable crushing of the oil film and therewith a better frictional engagement between the friction surfaces.

The shifting fork 23 is supported with the sleeve-shaped hub portion 27 thereof on a guide bolt member 28 which is arranged parallel to the axis of the clutch. The shifting sleeve 23 and therewith the hub portion 27 is supported on both sides thereof by means of springs 29 and 29' against the inwardly directed flange portions 30 and 30' of two hydraulic pressure cylinders 31 and 31'. The pressure cylinders 31 and 31' are constructed of annular shape, are arranged concentrically about the guide bolt member 28 and cooperate with the piston members 32 and 32' which are combined with the guide bolt member 28 into a unitary assembly and possibly are accommodated in a common housing 33. The arrangement of the cylinders 31 and 31' are disposed mirror-image like with respect to each other. Pressure oil or any other suitable pressure medium may be conducted into the cylinder spaces 136 and 136' through bores 34 and 35. A lubricating port is designated by reference numeral 135.

*Operation*

For purposes of engaging, for example, the right speed, i.e., for operatively connecting gear 14 with shaft 12, the left pressure cylinder 31 is moved toward the right by the application of a pressure medium admitted through bore 34. As a result thereof, the spring 29 is compressed and pushes the shifting sleeve 21 toward the right as seen in FIGURE 1 by means of shifting fork 23. As soon as the conically shaped engaging surfaces 26' come into mutual abutment, the synchronizing ring 17' is frictionally entrained or taken along by the frictional contact between surfaces 26' and is rotated with respect to the gear 14 by a predetermined amount so that the sinusoidally shaped locking surfaces 20' and 120' come into the locking positions thereof in which they abut against each other almost with the highest cam portions thereof and, under the influence of torque, prevent a further movement of the shifting sleeve 21 toward the right. The radial pins 25 and 25' thereby abut with the inclined surfaces 36, the so-called preparatory inclinations, against one another so that the axial thrust produced by the torque assures a safe synchronization, which however, is not sufficient for the force-locking engagement between the two clutch parts.

This position of the two clutch parts is maintained until synchronism is attained therebetween. If synchronism is once attained, then the locking effect of the sinusoidally shaped locking surfaces 20' ceases and the synchronizing ring 17' releases the further movement of the shifting sleeve 21 toward the right. The spring 29 may now press the synchronizing ring 17' over shifting sleeve 21 completely to the right until the locking surfaces 20' and 120' completely interengage with one another. At the same time, the pins 25 and 25' have arrived at the mutual engaging surfaces 37 thereof provided with stronger inclination, with the so-called main inclinations, and thereby produce from the torque a relatively larger axial thrust which establishes the force-locking engagement between the shifting sleeve 21 and the gear 14. As a result thereof, the speed including gear wheel 14 which may constitute the first speed and is disposed toward the right of the disengageable clutch is fully engaged.

For purposes of disengaging this speed, both pressure cylinders 31 and 31' are relieved of any pressure medium and therewith the left spring 29 is released of any compression, whereas the spring 29' retains the prestressing or precompression thereof which, now that the countereffect is no longer present, tensions or urges the shifting fork 23 in the disengaging direction toward the left as viewed in FIGURE 1. As long as the clutch 10, however, transmits any torque, the positions described hereinbefore remain, i.e., the first speed to the right of the clutch remains engaged because the axial thrust produced by the inclined surfaces 37 retains the clutch in the engaged condition.

However, as soon as the torque decreases to zero, for example, when the foot is taken off the gas pedal or by reason of the fact that another shafting connection or power path of the transmission slowly takes over the load, the axial thrust ceases and the spring 29' forces the shifting sleeve 21 over shifting fork 23 again into the neutral position thereof as shown in the drawing.

As pointed out hereinabove, gear 14 may constitute the first speed, while gear 13 may constitute the second speed and shaft 12 constitutes the output shaft of the transmission. In the position illustrated in FIGURE 1, the hub portion or shifting sleeve 21 is in the neutral position thereof without connection with either gear 13 or 14, and more particularly is located intermediate the two latter gears so that none of the afore-mentioned speeds is engaged. If the first speed has been engaged as described hereinabove, then upon acceleration of the vehicle in first speed, the output shaft 12 rotates. The gear 13 of the second speed thereby rotates faster than the shaft 12 as long as gear 14 of the first speed is engaged.

For purposes of engaging the second speed, it is necessary that the hub portion 21 move toward the left, which is realized by the use of the right pressure cylinder 31' when the latter is moved toward the left by the application of a pressure medium admitted through bore 35. Of course, it has been assumed that the pressure admitted through bore 34 for engagement of the first speed has been discontinued which is quite possible, since the forcelocking engagement of the clutch is assured by the inclined surfaces 37 and 37', so that the spring force of spring 29 becomes unnecessary to maintain engagement of the first speed.

As a result of admission of the fluid medium under pressure through bore 35, the spring 29' is compressed and thereby seeks to position the shifting sleeve 21 toward the left, as seen in FIGURE 1, by means of shifting fork 23. The eventual movement of the hub portion or shifting sleeve 21 toward the left brings the conically- shaped engaging surfaces 26 into mutual abutment so that the synchronizing ring 17 is frictionally entrained or taken along by the frictional contact between the friction surfaces 26 and is rotated relative to the gear 13. In other words, as soon as the shifting fork 23 is permitted to move toward the left as a result of the application of a pressure medium through bore 35, which movement of the shifting fork 23 will be permitted at a point in the shifting sequence to be described more fully hereinafter, the frictional engagement at the surfaces 26 seeks to entrain the synchronizing ring 17 so as to rotate at the same speed as shaft 12. However, since the gear 13 rotates at a speed different from that of shaft 12, the entrainment of the synchronizing ring 17 also produces a relative displacement or rotation of the synchronizing ring 17 with respect to the gear 13 so that the sinusoidally-shaped locking surfaces 20 and 120 arrive in the locking positions thereof in which they abut against each other almost with the highest cam portions thereof, and thereby prevent a further movement toward the left of the shifting sleeve 21 necessary to produce complete force-locking engagement at the friction surfaces 26.

Simultaneously with the axial displacement of the hub portion 21 toward the left, the radial pins 25 at the hub portion 21 with the surfaces 24 thereof have slidden off the surfaces 24' provided on pins 25' mounted on shaft 12, whereby the surfaces 24 or 24' were not capable to produce any force in the axial direction of the shaft, since they extend essentially parallel to the axis of the shaft 12. However, with the axial movement of the hub portion 21 toward the left, the pins 25 now engage with the surfaces 36 of relatively smaller inclination the surfaces 36' of the pins 25' thereby producing a force component in the axial direction seeking to move automatically the hub portion or shifting sleeve 21 toward the left. The axial force or thrust produced by abutment of the surfaces 36 and 36' is effective to produce a safe synchronization; however, such axial force or thrust is not sufficient itself to produdce the force-locking engagement at the conical friction surfaces 26 necessary to complete the engagement of the two parts 21 and 13 with each other. The complete force-locking engagement can take place only after synchronism exists between synchronizing ring 17 and gear 13 so that the sinusoidally-shaped locking surfaces 20 and 120 are able to return from the locking positions thereof into the normal positions thereof, thereby permitting the hub portion or shifting sleeve 21 to move further toward the left, as viewed in FIGURE 1, whereby the surfaces 37 and 37' of pins 25 and 25' come into engagement with each other and produce a thrust or force sufficient to cause complete force-locking engagement of the clutch due to the relatively larger inclination of these surfaces.

During shifting from first to second speed, a certain free-wheeling-like effect is produced within the clutch in accordance wtih the present invention. If it is assumed that the first speed is engaged in which the shaft 12 is coupled to the gear 14, then the gear 14 is driven by the corresponding gear disposed on the counter shaft and, in turn, drives over synchronizing ring 17' the shifting sleeve 21. The shifting sleeve 21 itself thereby pushes with the pins 25 thereof the pins 25' of the shaft 12 and thereby drives the shaft 12, which constitutes the transmission output shaft as mentioned hereinabove.

During such engagement of the first speed, an axial thrust is produced, as also pointed out hereinabove, by the interengagement of the pins 25 and 25' along the inclined surfaces 37 and 37' thereof, which axial thrust assures the force-locking engagement at the conicallyshaped friction surfaces 26'. During engagement of the first speed, as also pointed out hereinabove, both springs 29 and 29' normally abutting against the shifting fork 23, are relieved of any pretension, since the force-locking engagement is assured by the thrust produced by the engagement of pins 25 and 25'. Since, under these operating conditions, the gear 14 actually drives the shaft 12 forcibly, this operating condition or position of the clutch may be compared with the locking position of a freewheeling device, in which the shifting sleeve 21 may be compared to one free-wheeling ring of a conventional free-wheeling device which seeks to overtake the other free-wheeling ring constituted by shaft 12 and thereby takes along the latter securely.

It is now assumed that the driver engages the second speed with the shifting lever while, however, leaving his foot on the gas pedal of the vehicle. As a result of this actuation of the shifting lever, only the shifting fork 23 is pretensioned in the left direction by the admission of a fluid medium under pressure through bore 35. However, the first speed remains engaged as long as any torque is to be transmitted from the engine to the wheels of the vehicle by the clutch arrangement in accordance with the present invention, i.e. as long as the aforementioned axial thrust continues at the pins 25 and 25'. This operating condition prevails as long as torque is transmitted from the engine to the vehicle, i.e. as long as the driver continues to depress the gas pedal. If the driver now takes his foot off the gas pedal, the transmission of torque within the clutch in the direction from the engine to the vehicle wheels collapses, since the engine passes over into idling condition, in other words, the shaft 12 which continues to be driven by the vehicle at the same speed as before, now attempts to overtake the gear 14 which seeks to slow down with idling of the engine, since a reversal of the direction of transmission of torque takes place, as is well known. At this moment, the abutment at the pin members 25 and 25' changes, i.e. engagement of the pin members 25 and 25' at surfaces 37 and 37' thereof discontinues so that no axial thrust is produced any longer by such abutment. This condition corresponds by comparison to the disengaging position of a free-wheeling device. As a result of the disappearance of the axial thrust at pins 25 and 25' in the manner described hereinabove, the pretensioned spring 29' now commences to displace the shifting fork 23 and therewith the sleeve 21, at first into the neutral position thereof, as shown in FIGURE 1, and finally toward the left for engagement of the second speed in the manner described hereinabove.

Since immediately upon discontinuance of the force-locking engagement along the conical surfaces 26' an overtaking of the gear 14 by the shaft 12 takes place, the operation described hereinabove corresponds in its effect to a true overrunning free-wheeling device. The same manner of operation also takes place, in principle, during engagement of any speed, as is quite obvious.

The clutch offers, therefore, the effect of a free-wheeling device which is effective in both directions of rotation and which, depending on preloading or prestressing, automatically initiates the shifting operation as soon as the rotational speed difference between the two parts to be clutched is zero or the torque passes through zero. By means of any suitable conventional locking device (not shown) for the shifting fork to lock the same in the engaging position thereof, the free-wheeling effect of the shifting clutch in accordance with the present invention may be discontinued, for example, manually, semi-automatically or automatically, i.e., the clutch then transmits torque in alternate directions.

FIGURE 2 illustrates a modified embodiment in accordance with the present invention in which the actuation of the shifting sleeve 21 takes place electromagnetically. For that purpose, an annularly shaped soft iron core 38 is shrunk on the shifting sleeve 21 or secured thereon in any suitable manner so that the shifting sleeve 21 may become effective itself as core for the various electromagnets to be described more fully hereinafter. Of course, an indirect actuation by electromagnets, for example, by means of appropriate corresponding intermediate linkages would also be possible. The pole shoes 39, 40 and 41 of three electromagnets 42, 43 and 44, respectively, are arranged concentrically about the shifting sleeve 21 with the soft iron core 38. The two outer pole shoes 39 and 41 have an angularly shaped cross section so that they surround the soft iron core 38 at the end faces thereof.

Operation

The shifting operation of the embodiment according to FIGURE 2 is, in principle, the same as described hereinabove in connection with FIGURE 1. The center magnet 43 serves for purposes of shifting or maintaining the neutral position, whereas the outer magnets 42 and 44 serve for purposes of engaging the respective speeds, i.e., in the case illustrated, for example, of the first and second speeds of the transmission. A locking of the clutch in the engaged position could take place with the arrangement illustrated in FIGURE 2, for example, in that the respective shifting magnet 42 or 44 remain under current, i.e., energized for the period during which such locking is desired. However, for reasons of economy of energy and to avoid premature discharge of the battery, any suitable conventional mechanical locking device is preferable.

FIGURE 3 illustrates a motor vehicle change-speed transmission utilizing several of the shifting clutches of either type described hereinabove. A drum-shaped member 46 or any other suitable clutch carrier provided with two friction disk clutches 47 and 48 is driven from the crankshaft 45 of the driving engine (not shown). The engine output or driving torque may be selectively transmitted by means of clutches 47 and 48 to two paths of power flow or to two different shafting connections. One of the paths of power flow or shaft connections is formed by shaft 49 which drives a countershaft 51 over a pair of continuously meshing gears 50 and 50'. The second path of power flow or shaft connection consists of a hollow shaft 52 which is supported on shaft 49 and which drives a further countershaft 54 over a second pair of continuously meshing gears 53 and 53'. Two gears 55 and 56 are arranged freely rotatably on the first countershaft 51 which are in continuous meshing engagement with gears 57 and 58 suitably secured for common rotation with the output shaft 59. A reversing gear 60 for the reverse speed is thereby additionally arranged between gears 56 and 58 as is well known in the art. A shifting clutch assembly of the type described hereinabove is arranged for purposes of operatively and selectively connecting the gears 55 and 56 with countershaft 51, which shifting clutch is symbolically indicated by the shifting sleeve 61 representing a disengageable clutch construction of the type illustrated either in FIGURE 1 or in FIGURE 2, the other parts thereof being omitted in FIGURE 3 for sake of clarity.

Two gear wheels 62 and 63 are also arranged freely rotatably on the countershaft 54 which again are in continuous meshing engagement with the gear wheels 57 and 58, respectively, of the driven or output shaft 59. A disengageable shifting clutch symbolically represented by shifting sleeve 64 and of the type described hereinabove in connection with FIGURE 1 or FIGURE 2 is again inserted between the two gears 62 and 63 and countershaft 54 to selectively connect the latter with either one of the two gears 62 and 63. The output from the combustion engine may be directly transmitted to the driven or output shaft 59 from the shaft 49 over a one-sided or single-acting clutch 65 according to the principle described hereinabove with FIGURES 1 and 2 whereby clutch 65 may be of the type illustrated in either FIGURE 1 or FIGURE 2 and element 65' thereof corresponds to synchronizing ring 17 to prevent complete engagement of clutch 65 until synchronism exists between input and output shafts 45 and 59. Suitable sinusoidally shaped locking surfaces may thereby be provided on the sides of elements 65' and 50 facing each other.

Operation

The operation of the transmission illustrated in FIGURE 3 is as follows:

For purposes of engaging the first speed, for example, the shifting clutch 64 with clutches 47 and 48 disengaged is moved toward the right and thereupon the clutch 48 is slowly engaged or actuated for purposes of starting the vehicle.

For purposes of shifting into second gear or speed, the clutch 64 is released in the manner described hereinabove, i.e., it receives a pre-loading or pre-tensioning in the disengaging direction thereof, and simultaneously therewith the shifting clutch 61 is tensioned or urged toward the left. Instead of the clutch 48, the clutch 47 is thereupon slowly engaged and therewith the load is slowly shifted from one path of power flow or from one shafting arrangement to the other. In connection therewith, initially the first speed remains engaged while the clutch 61 passes over into the synchronizing position thereof. The torque, therefore, decreases at the clutch 64 and increases at the clutch 61. As soon as synchronism is attained at the shifting clutch 61 and the torque has fallen off to zero at the clutch 64, the former automatically engages and the latter automatically disengages. As a result thereof, the second speed is engaged whereby, during the shifting operation, no interruption of the transmission of torque occurs.

The shifting into other forward speeds as well as the shifting into reverse speed takes place in an analogous manner.

While I have shown and described several embodiments in accordance with the present invention, it is understood that the same is susceptible of many changes and modifications within the spirit and scope of the present invention. I, therefore, do not wish to be limited to the specific embodiments illustrated herein but intend to cover all such changes and modifications as are encompassed by the scope of the appended claims.

I claim:

1. A disengageable clutch comprising two clutch parts to be connected with each other and relatively movable with respect to each other in the engaging and disengaging directions thereof, said clutch parts including means forming conically shaped synchronizing and force-locking surfaces and inclined surfaces for producing an axial thrust from the torque for one of said two clutch parts effective in the engaging direction, shifting means for shifting said one clutch part, and actuating means including said first-mentioned means and auxiliary means for selectively pretensioning said shifting means to thereby provide, during synchronization, a lockable, free-wheeling-like effect adapted to be automatically engageable or disengageable during synchronism in speed of said two clutch parts or during reversal of torque and to provide complete-force-locking engagement at said force-locking surfaces between said two parts upon attaining synchronism.

2. A disengageable clutch according to claim 1, wherein said conically shaped synchronizing and force-locking surfaces have an angle of inclination no smaller than and close to the self-locking value thereof.

3. A disengageable clutch according to claim 1, further comprising shaft means supporting thereon said one clutch part, and wherein said first-mentioned means includes connecting means having inclined surfaces of different inclination for the synchronizing and force-locking positions thereof for connecting said shaft means with said one clutch part and for producing the engaging force during synchronization and force-locking operations, said surfaces of different inclination coming into operative abutment successively during said relative movement of said two clutch parts.

4. A disengageable clutch according to claim 3, further comprising synchronizing ring means at one of said two clutch parts with limited rotatability and including means forming locking surfaces for releasing further movement of the relatively movable clutch part from the synchronizing to the force-locking position thereof only upon attaining synchronism in the rotational speed of said two clutch parts.

5. A disengageable shifting clutch with respective synchronizing and force-locking positions, especially for motor vehicle change-speed transmissions, comprising two clutch parts to be coupled with each other, one of said clutch parts being axially movable with respect to the other clutch part in the engaging or disengaging direction during shifting of said clutch, said clutch parts including means forming conically shaped synchronizing and force-locking surfaces and inclined surfaces for producing an axial thrust from the torque for said axially movable clutch part effective in the engaging direction, shifting means for shifting said axially movable clutch part, actuating means to including said first-mentioned means and auxiliary means for selectively pretensioning said shifting means to thereby provide, during synchronization, a free-wheeling-like effect automatically engageable or disengageable during synchronism in speed of said two clutch parts or during reversal of torque, and synchronizing ring means at one of said two clutch parts having limited rotatability and including locking means for enabling further movement of said axially movable clutch part from said synchronizing position to said force-locking position to provide complete force-locking engagement at said force-locking surfaces only upon reaching synchronism in the rotational speed of said two clutch parts.

6. A disengageable clutch according to claim 5, wherein said synchronizing ring means is radially springy.

7. A disengageable clutch according to claim 5, wherein said synchronizing ring means is axially springy.

8. A disengageable clutch according to claim 5, wherein said synchronizing ring means is arranged on said axially movable clutch part and is provided with an external synchronizing surface, and wherein said shifting means is of sleeve-like construction simultaneously constituting said axially movable clutch part and provided with an internal countersurface, said synchronizing surface simultaneously constituting the force-locking surface.

9. A disengageable shifting clutch, especially for motor vehicle change-speed transmissions, comprising two clutch parts to be coupled with each other, one of said clutch parts being axially movable with respect to the other clutch part in the engaging or disengaging direction during shifting of said clutch, said clutch parts including means forming conically shaped synchronizing and force-locking surfaces and inclined surfaces for producing an axial thrust from the torque for said axially movable clutch part effective in the engaging direction, shifting sleeve means for shifting said axially movable clutch part, and actuating means including said first-mentioned means and auxiliary means for selectively pretensioning said shifting sleeve means and operative at said conically shaped synchronizing and force-locking surfaces to provide by said disengageable shifting clutch, in the respective shifting directions thereof, a lockable free-wheeling-like effect automatically engageable or disengageable during synchronism in speed of said two clutch parts or during reversal of torque.

10. A disengageable shifting clutch, especially for motor vehicle change-speed transmissions, comprising two clutch parts to be coupled with each other, one of said clutch parts being axially movable with respect to the other clutch part in the engaging or disengaging direction during shifting of said clutch, said clutch parts including means forming conically shaped synchronizing and force-locking surfaces and inclined surfaces for producing an axial thrust from the torque for said axially movable clutch part effective in the engaging direction, shifting sleeve means operatively connected with said axially movable clutch part for shifting said axially movable clutch part, and actuating means provided with an actuating member operatively connected with said shifting sleeve means for selectively pretensioning the latter during shifting including both auxiliary force means for controlling said actuating member and said first-mentioned means operative by the inclination of said conically shaped synchronizing and force-locking surfaces to provide by said clutch, in the respective shifting directions thereof, a lockable free-wheeling-like effect automatically engageable or disengageable during synchronism in speed of said two clutch parts or during reversal of torque.

11. A disengageable shifting clutch according to claim 10, wherein said actuating means includes spring-force storage means operatively connected between said auxiliary force means and said actuating member.

12. A disengageable shifting clutch according to claim 10, wherein said actuating member includes pressure cylinder means operative by the pressure medium of said auxiliary force.

13. A disengageable shifting clutch according to claim 12, wherein said pressure cylinder means is disposed with the axis thereof parallel to the axis of said clutch.

14. A disengageable shifting clutch according to claim 10, wherein said auxiliary force means includes a source of hydraulic pressure medium.

15. A disengageable shifting clutch according to claim 10, wherein said auxiliary force means includes a source of pneumatic pressure medium.

16. A disengageable shifting clutch according to claim 10, wherein said actuating means includes guide bolt means, two annular cylinder means disposed concentrically about said guide bolt means and each provided with inwardly directed flange means, said actuating member including a sleeve-shaped portion directly supported on said guide bolt means, piston means cooperating with each of said cylinder means, respective piston and cylinder means being movable relative to one another, and coil spring means on both sides of said actuating member for spring-supporting the latter against said two inwardly directed flange means.

17. A disengageable shifting clutch according to claim 16, wherein said two piston means are rigidly connected with each other.

18. A disengageable shifting clutch according to claim 17, wherein said two piston means are rigidly connected with each other by said guide bolt means.

19. A disengageable shifting clutch according to claim 10, wherein said auxiliary force means is operative by an electric auxiliary force.

20. A disengageable shifting clutch according to claim 10, wherein said auxiliary force means is operative by an electromagnetic force.

21. A disengageable shifting clutch according to claim 20, wherein said shifting sleeve means is formed as a core member and includes a soft iron annular core, and wherein said auxiliary force means includes at least two electromagnets operative during selective energization thereof to selectively move said shifting sleeve means into a neutral or engaged position.

22. A disengageable shifting clutch according to claim 21, wherein said auxiliary force means includes three electromagnets provided with annularly shaped pole-shoes, the central pole-shoe being operative to move said shifting sleeve means in the neutral position thereof whereas the two outer pole shoes are operative to selectively effect engagement or disengagement of said clutch.

23. A disengageable shifting clutch according to claim 22, further comprising means for locking said shifting sleeve means in the position thereof corresponding to engagement of said clutch to thereby disable the free-wheeling effect.

24. A disengageable shifting clutch according to claim 23, wherein said last-mentioned means includes mechanical and electromagnetic means for locking said shifting sleeve means.

25. A change-speed transmission for motor vehicles comprising input means, output means, means forming two normally inoperative paths of power flow each including a pair of meshing gears, clutch means for selectively connecting said input means with a respective one of said two paths of power flow, one of each pair of meshing gears being operatively connected with said output means, and means including disengageable shifting clutch means for selectively rendering each path of power flow operative with a respective pair of meshing gears, each shifting clutch means including at least two clutch parts relatively movable with respect to each other in the engaging and disengaging directions thereof, said clutch parts including means forming conically shaped synchronizing and force-locking surfaces and inclined surfaces for producing an axial thrust from the torque for one of the two movable clutch parts effective in the engaging direction, shifting means for shifting said one clutch part, and actuating means including said first-mentioned means and auxiliary means for selectively pretensioning said shifting means to provide by each shifting clutch means, in the respective shifting directions thereof, a lockable free-wheeling-like effect automatically engageable or disengageable during synchronism in speed of the clutch parts or during reversal of torque.

26. A change-speed transmission according to claim 25, further comprising means including another one of said disengageable shifting clutch means for connecting said input means directly to said output means.

27. A change-speed transmission according to claim 26, further comprising means for rendering the free-wheeling effect of at least one of said shifting clutch means inoperative by locking the same in the engaged position thereof.

28. A change-speed transmission comprising input means, output means, and means providing a plurality of transmission ratios for selectively connecting said input means with said output means including at least one disengageable shifting clutch, each shifting clutch including two clutch parts to be coupled with each other, one of said clutch parts being axially movable with respect to the other clutch part in the engaging and disengaging directions during shifting, said clutch parts including means forming conically shaped synchronizing and force-locking surfaces and inclined surfaces for producing an axial thrust from the torque for said axially movable clutch part effective in the engaging direction, shifting sleeve means for shifting said axially movable clutch part, and actuating means including said first-mentioned means and auxiliary means for selectively pretensioning said shifting sleeve means operative by the inclination of said conically shaped synchronizing and force-locking surfaces to provide by said disengageable shifting clutch, in the respective shifting directions thereof, a lockable free-wheeling-like effect automatically engageable or disengageable during synchronism in speed of said two clutch parts or during reversal of torque.

29. A change-speed transmission according to claim 28, further comprising means including a disengageable shifting clutch for directly connecting said input means to said output means.

30. A change-speed transmission according to claim 29, wherein said actuating means includes an actuating member operatively connected with said shifting sleeve means which is formed integrally with said axially movable clutch part, and auxiliary force means for controlling said actuating member.

31. A disengageable shifting clutch according to claim 9, further comprising means for locking said shifting sleeve means in a position corresponding to the engaged position of said clutch to thereby disable said free-wheeling effect.

References Cited in the file of this patent
UNITED STATES PATENTS

| | | |
|---|---|---|
| 1,403,052 | Morrison | Jan. 10, 1922 |
| 1,453,202 | Stevens | Apr. 24, 1923 |
| 1,720,989 | Ahlm | July 16, 1929 |
| 2,124,097 | Wolfram | July 19, 1938 |
| 2,397,883 | Peterson et al. | Apr. 2, 1946 |